United States Patent [19]

Kohler et al.

[11] 4,404,253
[45] Sep. 13, 1983

[54] MAGNETIC RECORDING MEDIUM

[75] Inventors: Robert Kohler, Wessling; Karlchristian Schilffarth, Sauerlach; Heinrich Kober, Hohenschaeftlarn; Burkhard Nippe, Munich, all of Fed. Rep. of Germany

[73] Assignee: Agfa-Gevaert Aktiengesellschaft, Leverkusen, Fed. Rep. of Germany

[21] Appl. No.: 352,208

[22] Filed: Feb. 25, 1982

Related U.S. Application Data

[63] Continuation of Ser. No. 137,745, Apr. 7, 1980, abandoned.

[30] Foreign Application Priority Data

Apr. 11, 1979 [DE] Fed. Rep. of Germany ....... 2914659

[51] Int. Cl.$^3$ ............................................. H01F 10/02
[52] U.S. Cl. ................................ 428/327; 252/62.54; 428/329; 428/425.9; 428/694; 428/900
[58] Field of Search ................................. 427/127–132, 427/48; 252/62.54; 428/900, 694, 327, 329, 425.9

[56] References Cited

U.S. PATENT DOCUMENTS

| | | | |
|---|---|---|---|
| 3,542,505 | 11/1970 | Pittman | 8/127.6 |
| 3,725,285 | 4/1973 | Denk et al. | 252/62.54 |
| 4,076,861 | 2/1978 | Furukawa et al. | 427/132 |
| 4,096,127 | 6/1978 | Schurmann et al. | 260/77.5 |
| 4,152,485 | 5/1979 | Mizumura et al. | 428/425 |
| 4,263,188 | 4/1981 | Hampton et al. | 260/29.2 |

FOREIGN PATENT DOCUMENTS

| | | |
|---|---|---|
| 2258685 | of 0000 | France . |
| 116248 | of 0000 | German Democratic Rep. . |
| 7313590 | of 1974 | Netherlands . |
| 922905 | of 1963 | United Kingdom . |
| 1076688 | of 1967 | United Kingdom . |
| 1415618 | of 1975 | United Kingdom . |

*Primary Examiner*—Bernard D. Pianalto
*Attorney, Agent, or Firm*—Connolly and Hutz

[57] ABSTRACT

Magnetic recording medium using water as dispersion medium. The magnetic layer comprises as binder an aqueous dispersion of polyurethane having functional groups capable of salt formation and a magnetic pigment. The volumetric ratio of magnetic pigment to polyurethane in terms of solids content is in the range of 0.7:1 to 1.4:1.

3 Claims, No Drawings

MAGNETIC RECORDING MEDIUM

CROSS-REFERENCE TO RELATED APPLICATION

This application is a continuation of application Ser. No. 137,745, filed Apr. 7, 1980 now abandoned for Mangetic Recording Medium And A Process For Its Manufacture, now abandoned.

This invention relates to magnetic recording media and their manufacture. The invention is particularly concerned with the composition and manufacture of magnetic layers on flexible supports, using coating systems which contain polymers dispersed in water and magnetic pigments.

The object of the polymers used according to the invention is to bind the magnetizable material to form an abrasion resistant layer and fix it firmly to the support.

The usual commercially available magnetic layers are generally prepared from solutions of polymers in organic solvents in which magnetic pigments are dispersed. Such coating systems have excellent adherence to the carrier foils and high mechanical strength and, above all, they allow for a very high packing density of the magnetic pigment in the layer, which is essential for obtaining the necessary practical storage properties. In the usual commercially available magnetic layers, the volumetric proportion of magnetizable material in the finished layer is generally in the region of 30 to 50%. The use of organic solvents for the preparation of magnetic layers does, however, involve certain disadvantages. The solvents and their vapours are both health and fire hazards. Elaborate safety precautions are necessary to prevent explosions and fires, and to protect the operators, and measures for solvent recovery are necessary to prevent contamination of the air and save raw material. It has repeatedly been proposed to overcome these serious disadvantages by producting magnetic coatings from polymer materials dissolved or dispersed in the water. Processes of this kind have been described, for example, in German Auslegeschriften Nos. 1,096,053 and 2,513,421; British Pat. No. 922,905, U.S. Pat. Nos. 3,725,285 and 3,795,539 and French Pat. No. 2,258,685. The polymers which have been recommended for the dispersions or solutions in water are mainly polymers of acrylic or methacrylic acid and acrylic and mechacrylic acid esters as well as copolymers of these compounds with each other or with other monomers such as vinyl chloride, vinylidene chloride and vinyl acetate. It has also been proposed to use mixtures of various polymers which are partly dissolved in water and partly dispersed as latices. Now it is known that polymers of the acrylate type are relatively thermoplastic, and since magnetic layers are normally compressed by calendering at high pressures and smoothed on their surface, the thermoplasticity may give rise to difficulties in the calendering process in that the layers are liable to stick to the rollers. For this reason, as well as to improve the inadequate mechanical resistance of magnetic coatings containing acrylate polymers, it is generally necessary to carry out a cross-linking reaction e.g. with condensation products of an amine, as described in French Pat. No. 2,258,685 and German Auslegeschrift No. 2,513,421.

Due to the permanent magnetism of the magnetizable material, such as ferromagnetic $\gamma$-$Fe_2O_3$ powder, an atraction exists between the individual particles which counteracts dispersion in a magnetic coating lacquer. It is obvious that dispersion is all the more difficult the higher the concentration of magnetizable material. At the same time, the qualities which make it possible for the material to withstand mechanical stress, such as the abrasion resistance and cohesion of the layers, decrease when the proportion of magnetizable material in the coating system exceeds a certain critical value. The maximum useful concentration of magnetizable material depends to a great extent on the nature of the polymer material used and the composition of the aqueous dispersion medium. In order to obtain good practical recording properties, packing densities of the magnetic pigment in the layer of at least 30 to 40 volume percent are necessary according to the known art, as already mentioned above. Such packing densities are generally only achieved if the proportion by volume of magnetizable material in the coating lacquer amounts to more than 40% of the total volume of solids content.

Such high pigmentation requires optimum dispersion of the pigment particles so that the magnetic forces of attraction between the particles are reduced as much as possible by electric surface charges and/or steric adsorption layers. This is not only necessary in order to stabilize the coating lacquers for the length of time required for processing but also essential in order to maintain the needle-shaped or rod-shaped pigment particles in such a state of mobility that they can easily be orientated in a preferential direction when cost.

The dispersibility of particles is determined mainly by the interaction between the magnetic pigments and dispersing agents on the one hand and the dispersion of polymeric binder on the other, and suitable dispersing agents must be found for each material and each individual polymer dispersion. One necessary condition to be fulfilled is that the dispersion of binder must be compatible with both the magnetic material and the dispersing agent. It has been found, however, that aqueous polymer dispersions and solutions of the type hitherto described in the literature cited above have only limited compatibility with additives so that the choice of suitable dispersing agents, for example, is very restricted. Dispersion of the pigments is therefore in most cases insufficient and this difficulty, combined with the disadvantages of these polymers already mentioned above, results in layers which, when they contain sufficient pigment, have insufficient mechanical strength. To this is added the fact that the aqueous dispersions or latices contain discrete polymer particles which are comparable in size with the pigment particles whereas polymer particles dissolved in organic solvents are very much smaller than pigment particles, which have dimensions of the order of 0.1 to 0.5 $\mu$m in length and 0.01 to 0.05 $\mu$m in width. If the pigment content is high, the pigment particles and polymer particles of the dispersions are liable to hinder each other in the formation of the layer. Layers formed in this way have poor cohesion and suffer higher abrasion than usual. Even when cross-linking has been carried out, this abrasion is still considerably greater than in the usual commercial layers as soon as the proportion of magnetizable material in the coating lacquer amounts to more than about 40% of the total solids content. It is also clear from the published descriptions that the aqueous coatings proposed contain a considerably reduced proportion of pigment. One result of this is that the packing densities in the finished layer are insufficient and may therefore by expected to result in inferior storage characteristics.

It is therefore an object of the present invention to provide magnetic coatings, using polymers in aqueous dispersions which do not have the disadvantages described above. It is particularly an object of this invention to provide magnetic coatings using water as dispersion medium, which are not only comparable to commercial magnetic layers in the packing density of the magnetizable material and hence equal in their storage technical characteristics but also have a similar capacity to withstand mechanical stresses.

This object is achieved according to the invention by a magnetic recording medium consisting of a flexible support in particular one based on polyethylene terephthalate having at least one magnetic layer applied from an aqueous dispersion of binder and containing, as its binder, an aqueous dispersion of polyurethanes having functional groups capable of salt formation and magnetic pigments, in which the volumetric ratio of pigment to polyurethane in terms of solids content, is in the range of 0.7:1 to 1.4:1.

These binder dispersions are dispersions of polyurethane ionomers in which the particle sizes are in the range of 20 nm to 1,000 nm, preferably below 400 nm. They consist of anionic polyurethane ionomers having functional groups capable of salt formation, with a proportion of $SO_3^-$ and/or $COO^-$ groups ranging from 0.02 to not more than 13% by weight, preferably 0.02 to 3% by weight, based on the polyurethane.

Methods of preparation of aqueous polyurethane dispersions have been described in German Pat. Nos. 1,184,946 and 1,178,586; German Auslegeschrift No. 1,237,306, German Offenlegungsschriften Nos. 1,495,705; 1,595,602; 1,770,068; 2,019,324 and 2,446,440 and British Pat. No. 1,076,688; see also D. Dietrich et al, Angew. Chemie 82, 53 (1970). These dispersions are based on the principle of the incorporation of hydrophilic centres in a macromolecular chain of a polyurethane molecule. These hydrophilic centres, or so called internal emulsifiers, stabilize the polymer particles. The dispersions are thereby substantially improved in their stability to the additives required for producing the magnetic layers. Their high stability to electrolytes renders them insensitive to the ions introduced with the magnetic pigments and thus provides the necessary condition for high pigmentation. Another advantage of polyurethane dispersions stabilized with internal emulsifiers is that the aqueous phase may be virtually free from emulsifier. For this reason, and owing to the high stability, the choice of dispersing agents used for dispersing the pigments is subject to virtually no restrictions, so that optimum combinations can be found. The polymer particles of the dispersions are extremely flexible and form elastic films with very high cohesion and excellent abrasion resistance even when the pigment contents are high.

To prepare the magnetic coating lacquers, the magnetizable pigment is dispersed in the aqueous polyurethane dispersion. For this purpose, it is necessary to break down the pigment agglomerates without damaging the primary pigment particles which are usually needle-shaped or rod-shaped. The dispersion process is therefore continued to an optimum stage at which the maximum quantities of primary particles are obtained but the number of damaged particles is still negligible. Any grinding or milling apparatus which fulfil this requirement may be used. Ball mills, pebble mills, sand mills and the like have proved to be suitable for this purpose. Dispersion may be effected by grinding the pigment down to the desired degree of fineness with water and suitable dispersing auxiliaries and then stirring the pigment paste into the polyurethane dispersion. Alternatively, if the polyurethane dispersions are stable to shearing forces, they may be put into the grinding apparatus together with the magnetic pigment. Subsequent application of the dispersions and drying to remove water are carried out in known manner.

Any of the usual ferromagnetic materials used for magnetic storage media may be used as the magnetizable material, for example, $\gamma$-$Fe_2O_3$, magnetite, iron oxides doped with cobalt or other metals, ferrites, stabilized $CrO_2$ pigments or powdered metal pigments.

Since the pigment particles attract each other because of their permanent magnetism and therefore tend to re-agglomerate, dispersion must be carried out in the presence of suitable dispersing agents which prevent irreversible flocculation of the particles by electrically charging the particles and/or building up sterically stabilizing adsorption layers. The nature and concentration of the dispersing agents must be adapted to the whole system since the necessary pigment packing density can only be obtained under optimum conditions of dispersion.

The following are examples of dispersing agents which may be used either singly or in combination:

(a) inorganic polymeric phosphorus compounds such as hexametaphosphates and polyphosphates, for example in the form of their alkali metal salts;

(b) Surface active agents such as alkyl benzene sulphonates, alkyl naphthalene sulphonates, primary, secondary or tertiary alkyl phosphates, lecithin, salts of alkyl sulphosuccinic acid, alkyl-phenyl-polyethylene oxides, ethoxylated fatty acid amines or their ammonium salts, polyoxy ethylene-fatty acid ethers, sorbitan fatty acid esters which may be modified with polyethylene oxide, surface active agents containing fluorine, such as perfluoralkyl sulphonic acids;

(c) organic water soluble polymers such as polymers of acrylic or methacrylic acid and their alkali metal or ammonium salts, polyacrylamides, natural colloids such as gelatine, gum arabic, casein or alginates, hydroxymethyl cellulose, polyethylene oxides and polypropylene oxides, block polymers of polyethylene oxide and polypropylene oxide, polyurethanes, polyvinyl alcohol, polyvinyl pyrollidone, polyvinyl sulphonates, copolymers of maleic acid anhydride and olefins, sulphated naphthalene condensates, polymeric alkyl naphthalene sulphonates and polymeric phosphoric acid esters.

The adsorption of the dispersing agents on the pigment and hence their dispersing action depends to a great extent on the pH of the system. The system must therefore generally be adjusted to the optimum pH, which is also necessary for the electrical interaction between pigment and polymer particles. The PH is preferably regulated by means of volatile acids and bases which can be removed from the layer in the drying process. In the case of anionic polyurethane dispersions and $\gamma$-$Fe_2O_3$, the pH is preferably in the range of 7 to 10, which can easily be adjusted with ammonia or amines. Although usable magnetic coating lacquers may in principle be obtained from the three components alone, i.e. the magnetic pigment, aqueous binder dispersion and dispersing agent, it is frequently advantageous to add certain additives to the lacquer. For example, the formation of foam which is liable to interfere with coating must be completely prevented. This is most suitably achieved by using suitable dispersing agents and a suitable method of working but may nevertheless also be necessary to add defoaming agents. It may also be necessary to modify the viscosity of the magnetic coating lacquer, for example by adding thickeners. Water soluble polymers such as polyacrylates, polymethacrylates, polyacrylamides and polyurethanes are suitable for this purpose. Fillers, lubricants and bonding agents may also be added to the dispersions in known manner as required. The usual materials may be used for the non-magnetic, flexible supports which should have a thickness of 3 to 50 μm, preferably 10 to 40 μm, in particular foils of linear polyesters such as polyethylene terephthalate. The magnetic layers may be produced in known manner. The ground, pigmented aqueous polyurethane dispersion is applied to the substrate by any of the usual coating processes using, for example, an extrusion coating apparatus or screen print coating apparatus. Before the layer is dried, the dispersion is oriented in a magnetic field. Drying is carried out at a temperature of 50° to 120° C. for 2 seconds to 10 minutes. The magnetic layer is surface treated by calendering, a process in which the layer is passed between polished heated rollers under pressure. The thickness of the magnetic layer is generally from 3 to 15 μm. The aqueous polyurethane dispersions may, of course, also be used to apply multiple layers and they may also be applied over a layer of binder which is soluble in organic solvents.

The recording media according to the invention are distinguished by their excellent mechanical properties and they have a capacity for orientation and a packing density at least equal to those of recording media produced from binders which are soluble in organic solvents.

The invention is described in more detail below in the following examples without being restricted to the examples.

EXAMPLE 1

120 g—distilled water
0.5 g—sodium polyphosphate
0.5 g—polyacrylate dispersing agent
100 g—$\gamma$-$Fe_2O_3$ The above components were ground in a planetary ball mill for 30 hours. The pigment paste was then stirred into 65 g of an aqueous anionic polyester-polyurethane dispersion containing 2.4% by weight of COO groups, based on a solids content of 35%. The polyurethane dispersion was prepared by the method of Example 3 of British Pat. No. 1,076,688, using adipic acid/neopentyl glycol/hexanediol polyester, 4,4'-diisocyanatodicyclohexyl methane and dimethyl propionic acid (neutralized with triethylamine as ionic component and N-methyl pyrrolidone as auxiliary solvent).

The dispersion was applied to a polyethylene terephthalate support having a thickness of 12 μm, using an extrusion coating apparatus, and magnetically oriented, dried to a layer thickness of 4 μm and calendered. The foil was cut up into strips 3.81 mm in width. The tapes obtained in this way had good abrasion resistance and anti-friction properties. Their magnetic values are entered in the Table, which shows their good capacity for orientation.

EXAMPLE 2

300 g—distilled water
2.5 g—$NH_3$ conc.
2.5 g—sodium polyphosphate
2.5 g—homopolymer of acrylic acid (molecular weight 200,000)
255 g—$\gamma$-$Fe_2O_3$
137 g—polyurethane dispersion according to Example 1.

In contrast to Example 1, all of the components were ground up together in a pebble mill for 3 hours. The volumetric ratio $\gamma$-$Fe_2O_3$: polyurethane is 1:1. Application of the layer and subsequent processing were carried out as in Example 1.

EXAMPLE 3

300 g—distilled water
2.5 g—$NH_3$ conc.
2.5 g—sodium polyphosphate
2.5 g—homopolymer of acrylic acid (molecular weight 200,000)
255 g—$\gamma$-$Fe_2O_3$
177 g—polyurethane dispersion according to Example 1.

The above components were processed in the same way as in Example 2, except that the volumetric ratio of $\gamma$-$Fe_2O_3$ to polyurethane (solids content) was raised to 1.2:1. A smoothly sliding layer with very high abrasion resistance and good magnetic orientation was obtained.

EXAMPLE 4

1300 g—distilled water
13 g—homopolymer of acrylic acid (molecular 200,000)
13 g—sodium polyphosphate
26 g—block polymer of polyethylene oxide (80%) and polypropylene oxide (20%)
2 g—block polymer of polyethylene oxide (10%) and polypropylene oxide (90%)
1300 g—$\gamma$-$Fe_2O_3$
620 g—polyurethane dispersion (40%) containing 0.96% $SO_3^-$ groups and having a particle size of 100 nm to 400 nm.

The polyurethane dispersion was prepared by a method analogous to that of Example 4 of German offenlegungsschrift No. 2,035,732, using the starting materials indicated there.

The above components were ground up in a pebble mill through which they were circulated continuously at a rate of 300 ml/min for 10 hours. The volumetric ratio of magnetic pigment to polyurethane (solids content) was 0.8:1. The layer obtained in this way was comparable in its results to those obtained in the previous examples.

EXAMPLE 5

A coating dispersion prepared by the same method as in Example 4 using an aqueous polyurethane dispersion prepared from similar components but in different proportions so that its $SO_3^-$ group content was 1.4% by weight and its solids content 30% and its particle size less than 400 nm (prepared according to German Offenlegungsschrift No. 2,446,440 (Example 8) was applied to a polyethylene terephthalate substrate 12 μm in thickness and then processed in the usual manner.

A magnetic tape having good mechanical and practical storage properties was obtained.

COMPARISON EXAMPLE 729 g—$\gamma$-$Fe_2O_3$ 167 g—partially hydrolized copolymer of vinyl chloride/vinyl acetate 18 g—mixture of primary and secondary phosphoric acid esters of ethoxyoxylated alkyl phenol 37 g—dodecyl benzene sulphonic acid 1.5 g—hydroquinone 711 g—ethyl acetate 704 g—butyl acetate.

The above components were dispersed in a sand mill to the extent required and the mixture obtained was applied in the usual manner to a 12 μm polyethylene glycol terephthalate support and exposed to a magnetic field before it was dried.

TABLE

| Experiments | Coercivity (kA/m) | $B_R/B_S$ | Packing Density (g/cm$^3$) |
|---|---|---|---|
| Example 1 | 28.2 | 0.84 | 1.75 |
| Example 2 | 29.0 | 0.86 | 1.80 |
| Example 3 | 28.6 | 0.83 | 1.80 |
| Example 4 | 27.8 | 0.84 | 1.85 |
| Example 5 | 28.2 | 0.84 | 1.85 |
| Comparison Example | 28.6 | 0.82 | 1.85 |

As can be seen from the Table, the magnetic tapes obtained from the aqueous polyurethane dispersions have a higher packing density than can be achieved with aqueous acrylate dispersions. The $B_R/B_S$ ratio is a measure of the direction of alignement; the values for this ratio obtained are equal or comparable to those of a tape prepared from binders which are soluble in organic solvents.

We claim:

1. A magnetic recording medium comprised of a flexible support and at least one magnetic layer on said support comprising a water dispersible binder and magnetic pigments wherein the improvement comprises the magnetic layer includes a binder comprised of anionic polyurethane ionomers particles containing from 0.02 to 13% by weight of $SO_3^-$ groups, being dispersed in water with dispersing agents, and said magnetic pigments and said polyurethane ionomer particles having a particle size of 20 nm to 400 nm, the volumetric ratio of magnetic pigment to polyurethane, based on the solids content, being in the range of 0.7:1 to 1.4:1.

2. A magnetic recording medium comprised of a flexible support and at least one magnetic layer on said support comprising a water dispersible binder and magnetic pigments wherein the improvement comprises
    the magnetic layer includes a binder comprised of anionic polyurethane ionomers particles containing from 0.02 to 13% by weight of $SO_3^-$ groups, being dispersed in water with a dispersing agent selected from the group consisting of sodium polyphosphate, sodium hexametaphosphate, a salt of polyacrylic or polymethacrylic acid and a block polymer of polyethylene oxide and polypropylene oxide, and said magnetic pigments and said polyurethane ionomer particles having a particle size of 20 nm to 400 nm, the volumetric ratio of magnetic pigment to polyurethane, based on the solids content, being in the range of 0.7:1 to 1.4:1.

3. Magnetic recording medium according to claim 2, characterised in that the anionic polyurethane ionomer preferably contains 0.02 to 3% by weight of $SO_3^-$ groups.

* * * * *